(12) United States Patent
Rana et al.

(10) Patent No.: US 8,375,178 B2
(45) Date of Patent: Feb. 12, 2013

(54) MEMORY PAGE EVICTION BASED ON PRESENT SYSTEM OPERATION

(75) Inventors: Inaam Ahmed Rana, North York (CA); Heikki Tuuri, Helsinki (FI)

(73) Assignee: Oracle International Corporation, Redwood Shores, CA (US)

( * ) Notice: Subject to any disclaimer, the term of this patent is extended or adjusted under 35 U.S.C. 154(b) by 1127 days.

(21) Appl. No.: 12/291,658

(22) Filed: Nov. 12, 2008

(65) Prior Publication Data

US 2010/0122058 A1 May 13, 2010

(51) Int. Cl.
*G06F 12/00* (2006.01)
*G06F 13/00* (2006.01)
*G06F 13/28* (2006.01)

(52) U.S. Cl. ............ 711/154; 711/160; 710/52

(58) Field of Classification Search ............ 711/166, 711/154
See application file for complete search history.

(56) References Cited

U.S. PATENT DOCUMENTS

| | | | |
|---|---|---|---|
| 7,587,572 B1 * | 9/2009 | Stenstrom | 711/173 |
| 7,636,810 B2 * | 12/2009 | Ramakrishnan | 711/118 |
| 2001/0001872 A1 * | 5/2001 | Singh et al. | 711/129 |
| 2003/0217237 A1 * | 11/2003 | Benveniste et al. | 711/153 |
| 2008/0301256 A1 * | 12/2008 | McWilliams et al. | 709/214 |

\* cited by examiner

*Primary Examiner* — Brian Peugh
*Assistant Examiner* — Prasith Thammavong
(74) *Attorney, Agent, or Firm* — Kraguljac Law Group, LLC

(57) ABSTRACT

Systems, methods, and other embodiments associated with selecting a memory page for removal from a buffer pool based on the operating conditions of a computing system.

22 Claims, 6 Drawing Sheets

MEMORY PAGE EVICTION BASED ON PRESENT SYSTEM OPERATION

BACKGROUND

Computing systems typically store large amounts of data. To enhance system performance, data is often stored in a compressed form in storage media, such as, for example, a hard disk, until it is needed by the computing system. When data must be accessed by the computing system, pages of memory that store the data in compressed form are retrieved from storage media and stored in a buffer pool that is part of the computing system's operating memory. The compressed memory pages may be decompressed so that data can be updated, modified, or deleted. The decompressed memory pages may remain in the buffer pool.

Memory pages are periodically evicted from the buffer pool to make room for new pages that contain data currently being accessed by the system. Often, the least recently used compressed memory page is evicted to free up room in the buffer pool for new memory pages. In certain operating circumstances, the least recently used compressed memory page may not be the optimal choice in terms of system performance, and/or memory management.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
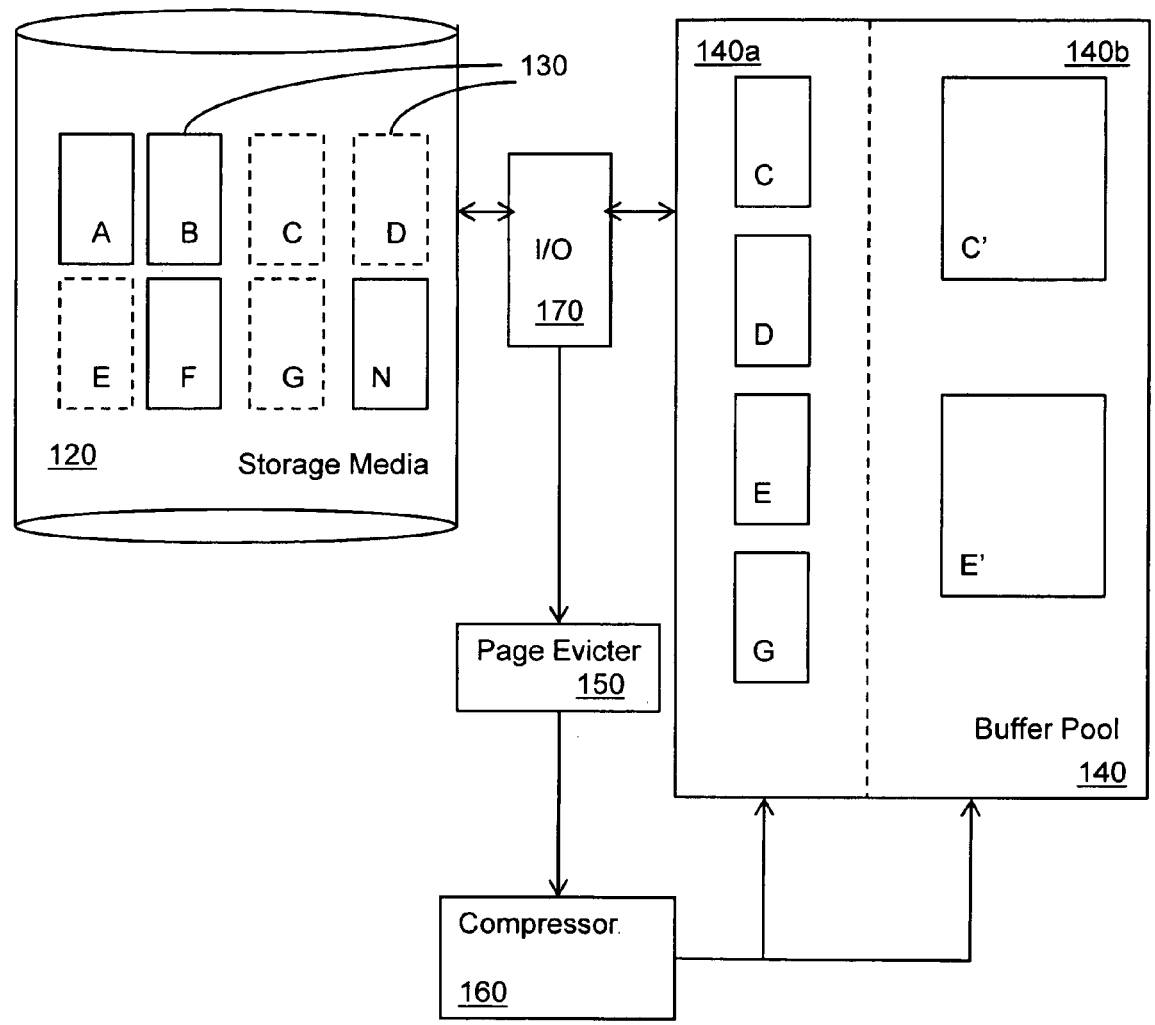
FIG. 1 illustrates an example embodiment of a system associated with memory page eviction.

Depending on the present operating conditions of a computing system, the input/output related components or the central processing unit (CPU) may be a limiting factor in the system's performance. Hence, the computing system may be in an input put/output bound condition in which the input/output components are operating at maximum capacity or CPU-bound condition in which the CPU is operating at maximum capacity. Computing systems that store both compressed and decompressed memory pages in operating memory utilize input/output components to retrieve compressed memory pages from storage media, such as, for example, a hard disk. Input/output components are also used to return compressed memory pages to the storage media. The CPU is used to decompress and compress memory pages stored in the operating memory.

Typically, when it is necessary to evict a memory page that is stored in operating memory to liberate storage capacity, the least recently used memory page is selected for eviction regardless of the present operating condition of the system. The systems and methods described herein select a memory page for eviction from operating memory based on the present operating condition of the system. "Eviction" may be accomplished in numerous ways, depending, for example, on whether a compressed or decompressed memory page is being acted upon. For example, since a compressed page is typically an up to date version of its corresponding decompressed page, the memory used by the decompressed page can be made immediately available when the page is selected for eviction. If a compressed memory page is selected for eviction that has been modified while it is in the buffer pool, the compressed memory page is written to disk prior to the memory used by the compressed page being made available.

When the system is input/output bound and the CPU has spare operating capacity that can be used to decompress compressed memory pages in the operating memory, a decompressed memory page may be selected for removal. When the system is CPU bound, a compressed memory page (and, in some example embodiments, a corresponding decompressed memory page) may be selected for removal because the input/output system has unused capacity to move additional compressed memory pages to and from the storage media.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Referring to FIG. 1, selected components of a computing system are shown. A storage media 120 stores compressed memory pages A-N. An input/output component 170 is operatively coupled to the storage media 120 and is configured to retrieve compressed memory pages from the storage media 120. In some embodiments, the I/O component includes a memory controller. In some example embodiments, the storage media 120 includes a hard disk. The input/output component 170 is also configured to store compressed memory pages in the storage media. Input/output operations are performed by the input/output component 170 at an input/output rate.

A buffer pool 140 is operatively coupled to the input/output component 170. The buffer pool 140 is configured to store compressed memory pages (such as, for example, compressed memory pages C, D, E, G) that are received from the input/output component. The buffer pool 140 also stores decompressed memory pages (such as, for example, decompressed memory pages C', E' that are decompressed versions of compressed memory pages C and E, respectively).

A memory page compressor 160 is configured to compress decompressed memory pages (such as, for example, decompressed memory pages C', E') in the buffer pool 140 for storage in the storage media 120. The memory page compressor 160 is also configured to decompress compressed memory pages in the buffer pool. In the illustrated example embodiment, the compressor 160 has decompressed the compressed memory page C to provide the decompressed memory page C'. During operation, decompression of compressed memory pages is occurring at a decompression rate. The decompression rate will change depending on the present operating condition of the computing system.

A page evicter 150 is configured to determine a present relationship between the input/output rate and the decompression rate. This relationship gives an indication as to whether the system is operating in an input/output bound condition or in a CPU bound condition. The page evicter 150 selects a decompressed memory page for eviction from the buffer pool 140 when the relationship between the input/output rate and the decompression rate meets a decompressed page eviction criteria. The decompressed page eviction criteria corresponds to a relationship between the input/out rate and the decompression rate that indicates that the system is operating in an input/output bound condition so that a decompressed memory page should be evicted. To accomplish this, the page evicter evicts the selected decompressed memory page (such as, for example, decompressed memory page C') from the buffer pool 140 while a compressed memory page corresponding to the decompressed memory page (such as, for example compressed memory page C) is maintained in the buffer pool 140.

In some example embodiments, the buffer pool 140 includes a first list 140a that stores compressed memory pages and a second list 140b that stores decompressed memory pages. In some of these example embodiments, the second list 140b includes a decompressed memory page (such as, for example, decompressed memory pages C', E') corresponding to at least a subset of the compressed memory pages (such as, for example, compressed memory pages C, D, E, G) on the first list 140a. In these instances, each member of the second list is a member of the first list.

In some example embodiments, the page evicter is configured to determine a present relationship between the input/output rate and the decompression rate by determining an operation ratio between a sum of a running average of the number of input/output operations occurring in a given most recent n intervals and a number of input/output operations occurring in a present interval and a sum of a running average of a number of decompression operations occurring in the same n intervals and a number of decompression operations occurring in the present interval. In some example embodiments, the decompressed page eviction criteria specifies an operation ratio of greater than approximately 50.

In some example embodiments, the buffer pool 140 includes two lists of memory pages: a first list 140a that includes least recently used compressed memory pages and second list 140b that includes least recently used decompressed memory pages. In some example embodiments, the buffer pool 140 includes a compressed memory page for each decompressed memory page. In some example embodiments whenever a compressed memory page is evicted, its corresponding decompressed memory page is also evicted.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2A:
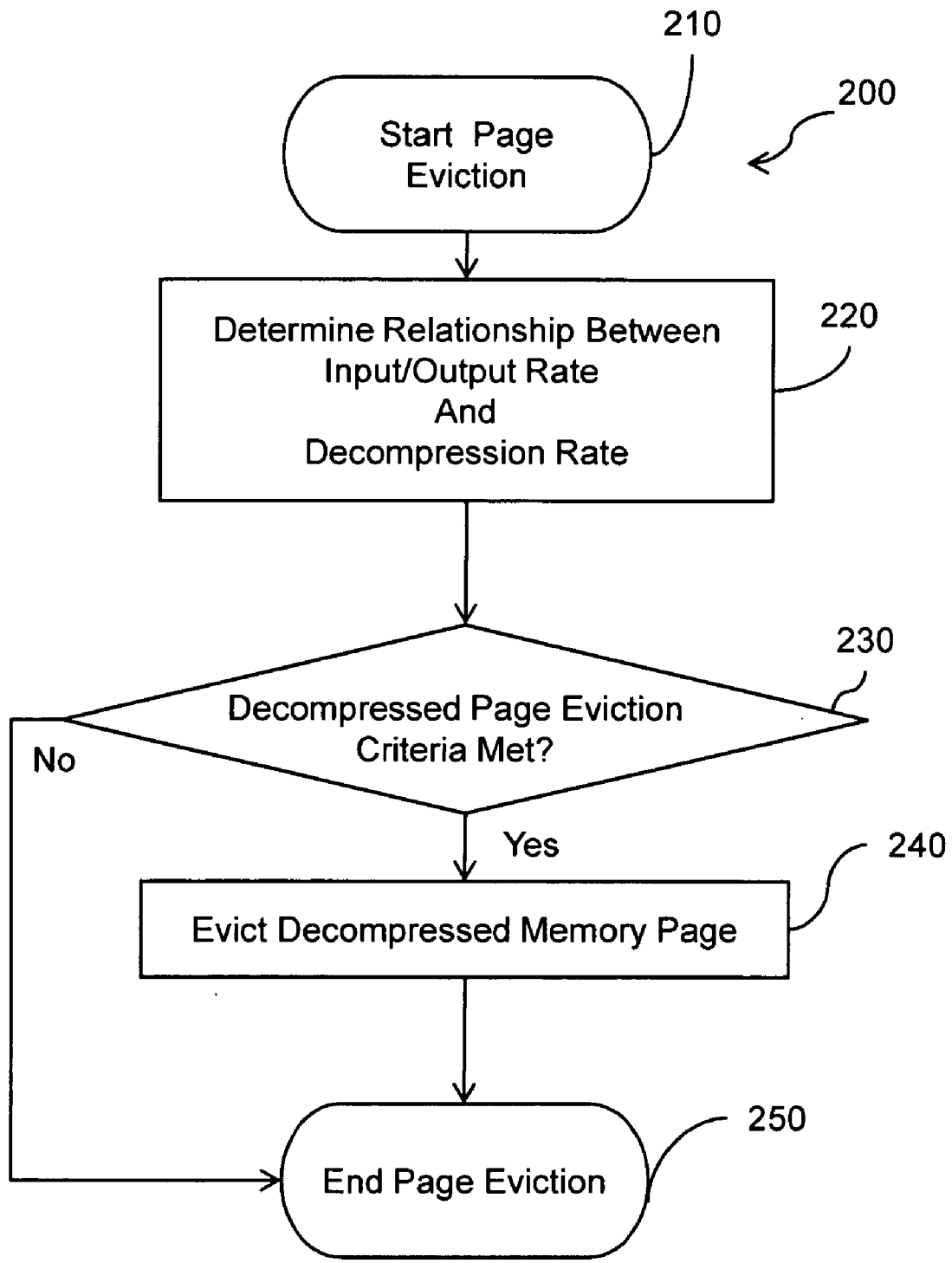
FIGS. 2A and 2B illustrate example embodiments of methods associated with memory page eviction.

FIG. 2A is one embodiment of a flow diagram outlining a computer-implemented page eviction method 200 that evicts memory pages from a buffer pool that stores compressed memory pages and decompressed memory pages for access by a computing system. During performance of the method, input/output operations are being performed at an input/output rate by the computing system and memory page decompression operations are occurring at a decompression rate. When a memory page is to be removed from the buffer pool, at 210 the page eviction method is performed. At 220, a present relationship between the input/output rate and the decompression rate is determined. At 230, a decompressed memory page is selected for eviction from the buffer pool when the relationship between the input/output rate and the decompression rate meets a decompressed page eviction criteria. The selected decompressed memory page is evicted from the buffer pool at 240. Any compressed memory page corresponding to the selected decompressed memory page is maintained in the buffer pool. In some example embodiments, the decompressed memory page that is selected for eviction is a least recently used decompressed memory page. At 250, the page eviction method ends.

Figure 2B:
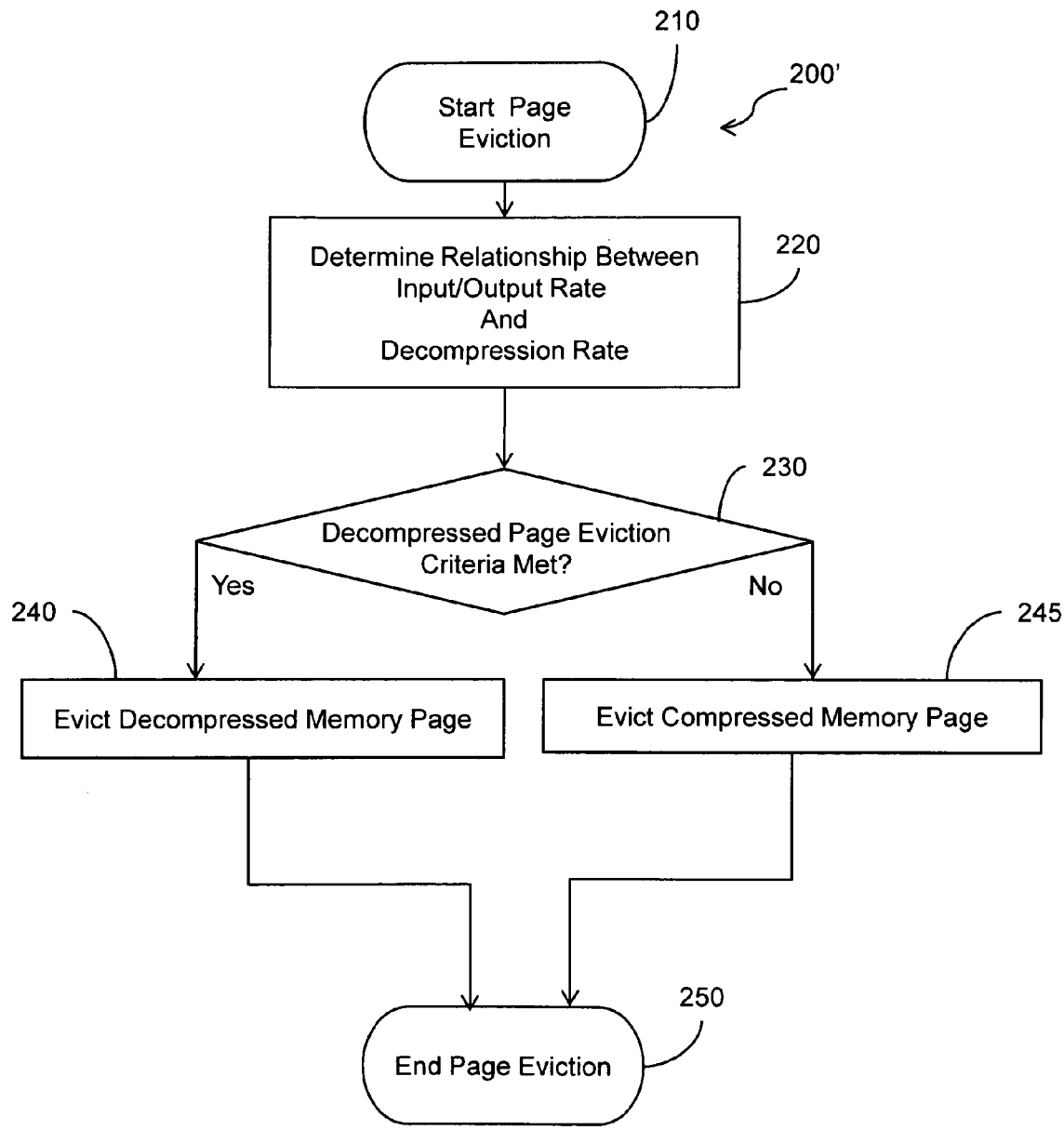

FIG. 2B is a flow diagram that outlines an example embodiment of a page eviction method 200' that evicts a compressed memory page at 245 from the buffer pool when the relationship between the input/output rate and the decompression rate does not meet the decompressed page eviction criteria. In some example embodiments, both a compressed memory page and its corresponding decompressed memory page are evicted from the buffer pool when the relationship between the input/output rate and the decompression rate does not meet the decompressed page eviction criteria.

Figure 3:
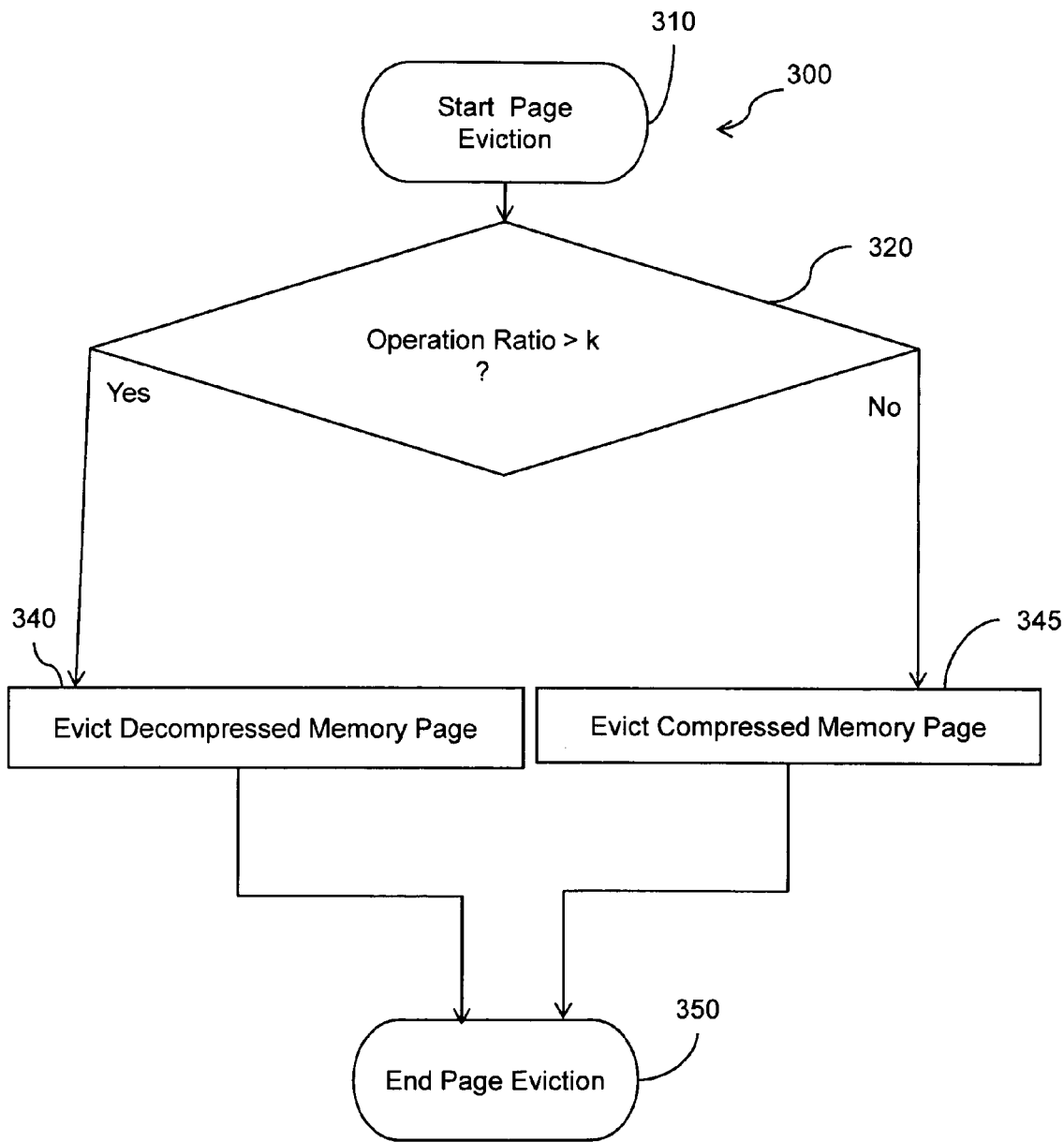
FIG. 3 illustrates another embodiment of a method associated with memory page eviction.

FIG. 3 is a flow diagram that outlines an example embodiment of a page eviction method 300 that begins at 310. At 320, a present relationship between the input/output rate and the decompression rate is determined by determining an operation ratio of a weighted running average of the input/output rate to a weighted average of the decompression operation rate. In some example embodiments, the weighted running average of the input/output operation rate corresponds to a sum of a running average of the number of input/output operations occurring in a given most recent n intervals and a number of input/output operations occurring in a present interval. The weighted running average of the decompression operation rate corresponds to a sum of a running average of a number of decompression operations occurring in the same n intervals and a number of decompression operations occurring in the present interval. If the operation ratio is greater than a threshold operation ratio "k" at 340 a decompressed memory page is evicted from the buffer pool. At 345 a compressed memory page is evicted from the buffer pool if the operation ratio is not greater than the threshold operation ratio "k". At 350 the page eviction method ends. In some example embodiments, the threshold operation ratio "k" is 50.

Thus, in some example embodiments, the page eviction method keeps track of which pages to retain in memory and which to evict in a manner that allows frequently accessed pages to stay in memory. When compressed pages are accessed, the page eviction method tends to balance the mix of compressed and decompressed pages in memory. In some example embodiments, the page eviction method is sensitive to whether the system is running input/output bound or CPU bound.

Figure 4:
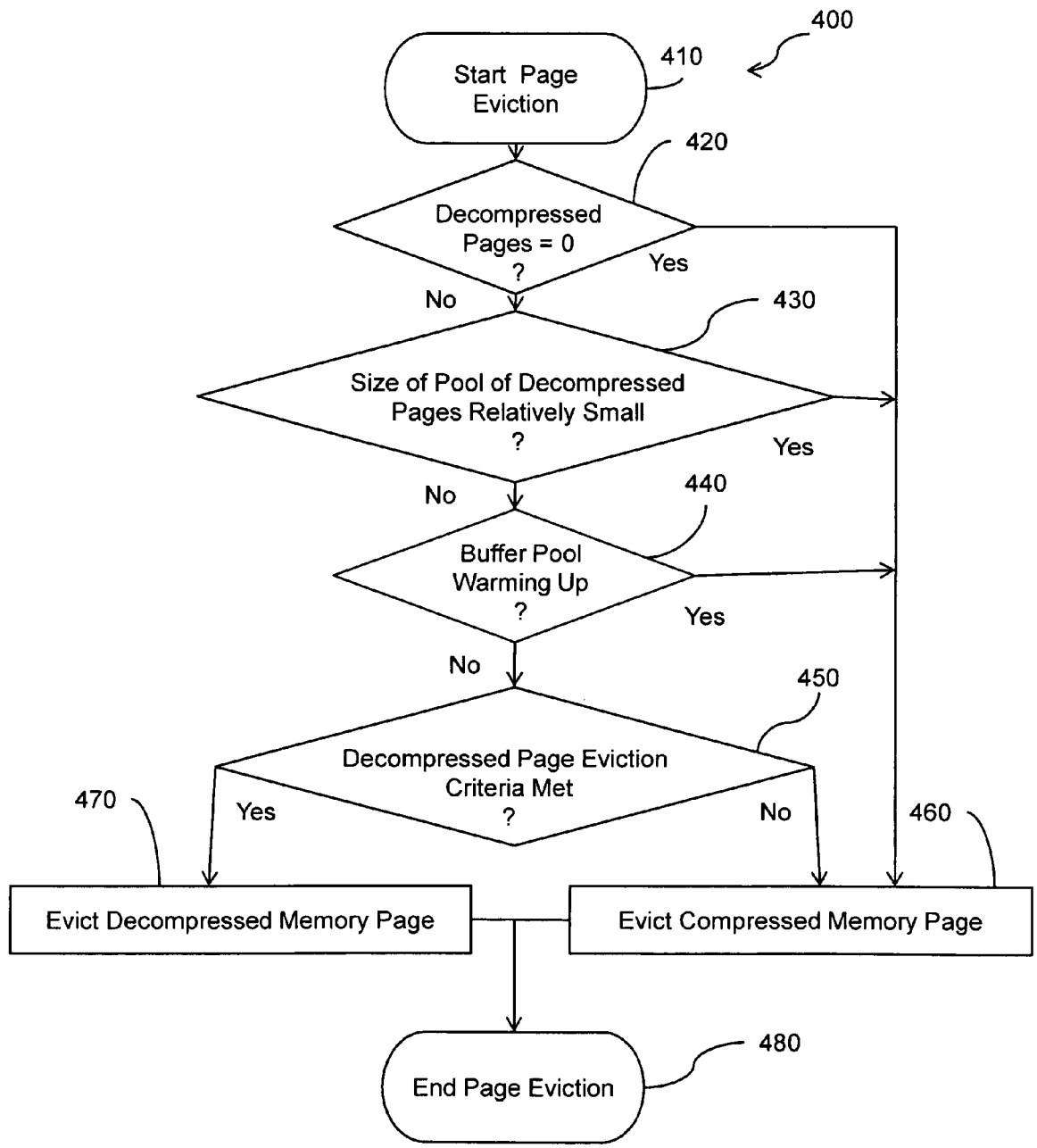
FIG. 4 illustrates another embodiment of a method associated with memory page eviction.

FIG. 4 is a flow diagram that illustrates a page eviction method 400 that begins at 410. At 420 if no decompressed pages are stored in the buffer pool a compressed memory page is evicted at 460. At 430 if the combined size of the decompressed pages stored in the buffer pool is below a predetermined minimum size a compressed memory page is evicted at 460. In some example embodiments, at 430 if the combined sized of the decompressed pages stored in the buffer is less than approximately 10% of the combined size of the compressed pages stored in the buffer pool a compressed memory page is evicted at 460. At 440 if the buffer pool is still warming up, such as when, for example, a cumulative number of memory pages that have been evicted is below a start-up threshold number of evicted memory pages, a compressed memory page is evicted at 460. At 450 if the decompressed page eviction criteria is met at 470 a decompressed memory page is evicted. If the decompressed page eviction criteria is not met, at 460 a compressed memory page is evicted. At 480 the page eviction method ends.

While FIGS. 2A, 2B, 3 and 4 illustrate various actions occurring in serial, it is to be appreciated that various actions illustrated in the Figures could occur substantially in parallel. By way of illustration, a first process could determine a relationship between the input/output rate and the decompression rate, a second process select a decompressed page for eviction, and a third process could evict the memory page. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes monitoring a present input/output rate at which the computer is performing input/output operations; monitoring a present decompression rate at which the computer is decompressing compressed memory pages; determining a relationship between the present input/output rate and the present decompression rate; and selecting either a compressed memory page or a decompressed memory page for eviction from a buffer pool based on the determined relationship.

While executable instructions associated with the above method are described as being stored on a computer-readable medium, it is to be appreciated that executable instructions associated with other example methods described herein may also be stored on a computer-readable medium.

Figure 5:
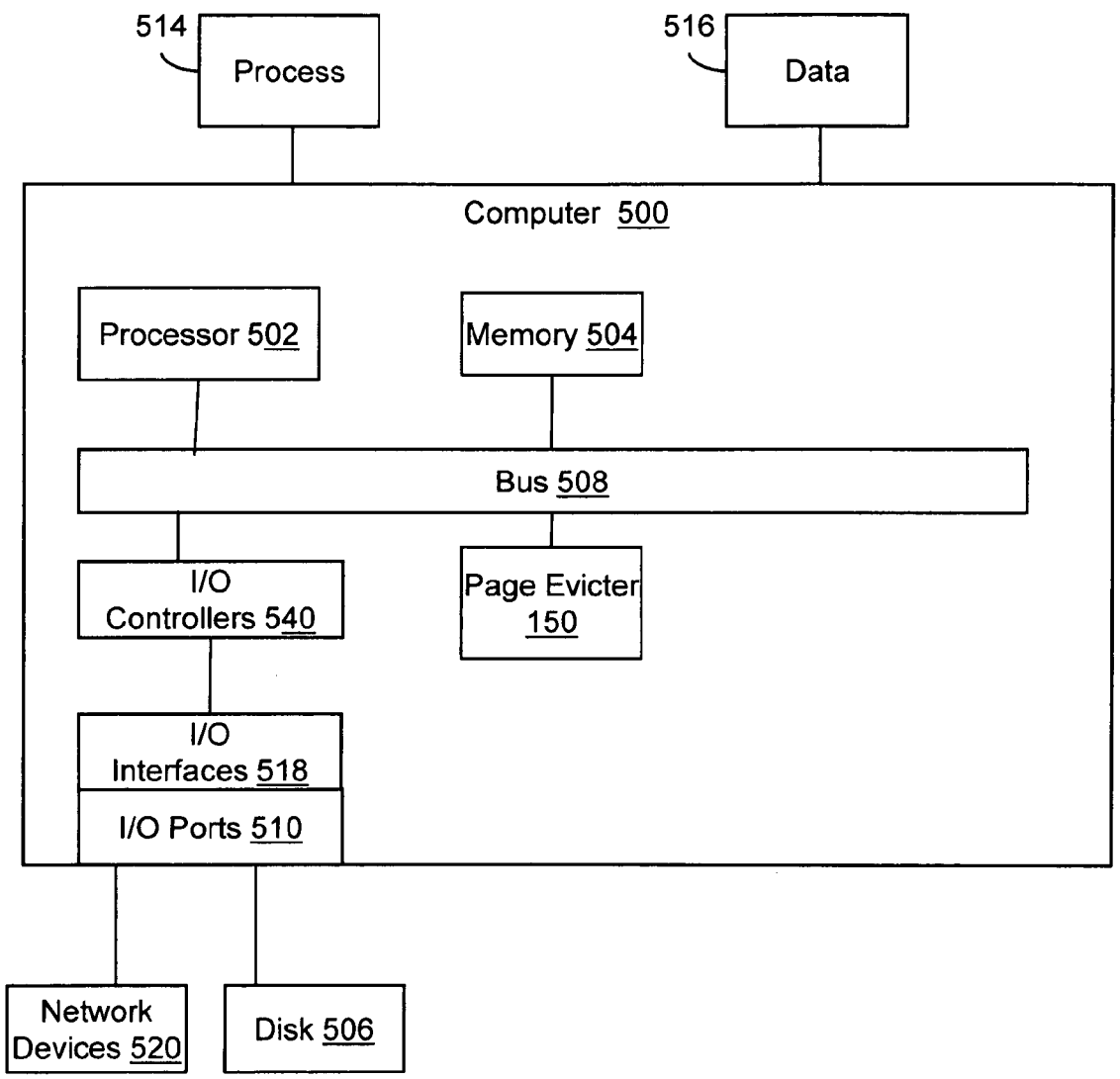
FIG. 5 illustrates an example embodiment of a computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a page evicter 150 configured to evict memory pages based on present system operation. In different examples, the page evicter 150 may be implemented in hardware, software, firmware, and/or combinations thereof. While the page evicter 150 is illustrated as a hardware component attached to the bus 508, it is to be appreciated that in one example, the page evicter 150 could be implemented in the processor 502.

Thus, the page evicter 150 may provide means (e.g., hardware, software, firmware) for determining a present relationship between the input/output rate and the decompression rate and means for selecting a decompressed memory page for eviction from the buffer pool when the relationship between the input/output rate and the decompression rate meets a decompressed page eviction criteria.

The means may be implemented, for example, as an ASIC programmed to evict memory pages based on present system operation. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that when executed by a computer cause the computer to perform a method that evicts memory pages from a buffer pool that stores compressed memory pages and decompressed memory pages for access by a computing system, where input/output operations are being performed at an input/output rate by the computing system and where memory page decompression operations are occurring at a decompression rate, the method comprising:
   determining a present relationship between the input/output rate and the decompression rate; and
   selecting a decompressed memory page for eviction from the buffer pool when the relationship between the input/output rate and the decompression rate meets a decompressed page eviction criteria;
   evicting the selected decompressed memory page from the buffer pool while a compressed memory page corresponding to the selected decompressed memory page is maintained in the buffer pool.

2. The non-transitory computer-readable medium of claim 1 where selecting a decompressed memory page is performed by selecting a least recently used decompressed memory page.

3. The non-transitory computer-readable medium of claim 1 where determining a present relationship between the input/output rate and the decompression rate is performed by determining an operation ratio between a sum of a running average of the number of input/output operations occurring in a given most recent n intervals and a number of input/output operations occurring in a present interval and a sum of a running average of a number of decompression operations occurring in the same n intervals and a number of decompression operations occurring in the present interval, where n represents a positive number.

4. The non-transitory computer-readable medium of claim 3 where the decompressed page eviction criteria comprises an operation ratio of approximately 50.

5. The non-transitory computer-readable medium of claim 1 further comprising selecting a compressed page for eviction from the buffer pool if no decompressed pages are stored in the buffer pool.

6. The non-transitory computer-readable medium of claim 1 further comprising selecting a compressed page for eviction from the buffer pool if the combined size of the decompressed pages stored in the buffer pool is below a predetermined minimum size.

7. The non-transitory computer-readable medium of claim 6 where the predetermined minimum size is 10% of a combined size of the compressed pages stored in the buffer pool.

8. The non-transitory computer-readable medium of claim 1 further comprising selecting a decompressed page for eviction from the buffer pool if a cumulative number of memory pages that have been evicted is below a start-up threshold number of evicted memory pages.

9. The non-transitory computer-readable medium of claim 1 where a compressed memory page is evicted from the buffer pool when the relationship between the input/output rate and the decompression rate does not meet the decompressed page eviction criteria.

10. The non-transitory computer-readable medium of claim 1 where the buffer pool stores a compressed memory page corresponding to each decompressed memory page stored in buffer pool.

11. The non-transitory computer-readable medium of claim 10 where a compressed memory page and its corresponding decompressed memory page are evicted from the buffer pool when the relationship between the input/output rate and the decompression rate does not meet the decompressed page eviction criteria.

12. A computing system comprising:
    storage media storing compressed memory pages;
    an input/output component operatively coupled to the storage media, the input/output component configured to retrieve compressed memory pages from the storage media and to store compressed memory pages in the storage media, the input/output component performing input/output operations at an input /output rate;
    a buffer pool operatively coupled to the input/output component, the buffer pool configured to store compressed memory pages received from the input/output component and decompressed memory pages;
    a memory page compressor configured to compress decompressed memory pages in the buffer pool for storage in the storage media and to decompress compressed memory pages in the buffer pool, where decompression of memory pages is occurring at a decompression rate; and
    a page evicter configured to;
        determine a present relationship between the input/output rate and the decompression rate;
        select a decompressed memory page for eviction from the buffer pool when the relationship between the input/output rate and the decompression rate meets a decompressed page eviction criteria; and
        evict the selected decompressed memory page from the buffer pool while a compressed memory page corresponding to the selected decompressed memory page is maintained in the buffer pool.

13. The computing system of claim 12 where the storage media comprises a hard disk.

14. The computing system of claim 12 where the buffer pool comprises a first list comprising compressed memory pages and a second list comprising decompressed memory pages.

15. The computing system of claim 14 where the second list comprises a decompressed memory page corresponding to at least a subset of the compressed memory pages on the first list such that each member of the second list is a member of the first list.

16. The computing system of claim 12 where the page evicter is configured to determine a present relationship between the input/output rate and the decompression rate by determining an operation ratio between a sum of a running average of the number of input/output operations occurring in a given most recent n intervals and a number of input/output operations occurring in a present interval and a sum of a running average of a number of decompression operations occurring in the same n intervals and a number of decompression operations occurring in the present interval, where n represents a positive number.

17. The computing system of claim 16 where the decompressed page eviction criteria comprises an operation ratio of approximately 50.

18. A non-transitory computer-readable medium storing computer-executable instructions that when executed by a computer cause the computer to perform a method, the method comprising:
    monitoring a present input/output rate at which the computer is performing input/output operations;
    monitoring a present decompression rate at which the computer is decompressing compressed memory pages;
    determining a relationship between the present input/output rate and the present decompression rate;
    selecting a memory page for eviction from a buffer pool based on the determined relationship, where the buffer pool contains compressed and decompressed pages; and
    evicting the selected memory page from the buffer pool.

19. The non-transitory computer-readable medium of claim 18 where the instructions for determining a relationship between the present input/output rate and the present decompression rate comprise determining an operation ratio between a sum of a running average of the number of input/output operations occurring in a given most recent n intervals and a number of input/output operations occurring in a present interval and a sum of a running average of a number of decompression operations occurring in the same n intervals and a number of decompression operations occurring in the present interval.

20. The non-transitory computer-readable medium of claim 19 where the instructions for selecting a memory page for eviction from a buffer pool is performed by selecting a decompressed memory page for eviction from the buffer pool when the operation ratio is above a threshold operation ratio.

21. The non-transitory computer-readable medium of claim 19 where the instructions for selecting a memory page for eviction from a buffer pool comprise selecting a compressed memory page for eviction from the buffer pool when the operation ratio is not above a threshold operation ratio.

22. The non-transitory computer-readable medium of claim 21 where the instructions for selecting a memory page for eviction from a buffer pool comprise selecting a compressed memory page and its corresponding decompressed memory page for eviction from the buffer pool when the operation ratio is not above the threshold operation ratio.

\* \* \* \* \*

UNITED STATES PATENT AND TRADEMARK OFFICE
CERTIFICATE OF CORRECTION

PATENT NO. : 8,375,178 B2
APPLICATION NO. : 12/291658
DATED : February 12, 2013
INVENTOR(S) : Rana et al.

Page 1 of 1

It is certified that error appears in the above-identified patent and that said Letters Patent is hereby corrected as shown below:

In the Specification

In column 1, line 59, delete "input put/output" and insert -- input/output --, therefor.

Signed and Sealed this
Second Day of July, 2013

Teresa Stanek Rea
*Acting Director of the United States Patent and Trademark Office*